May 12, 1931. D. H. VAN HOVE 1,804,722
SPRING SEAT STRUCTURE
Filed July 28, 1928 4 Sheets-Sheet 1
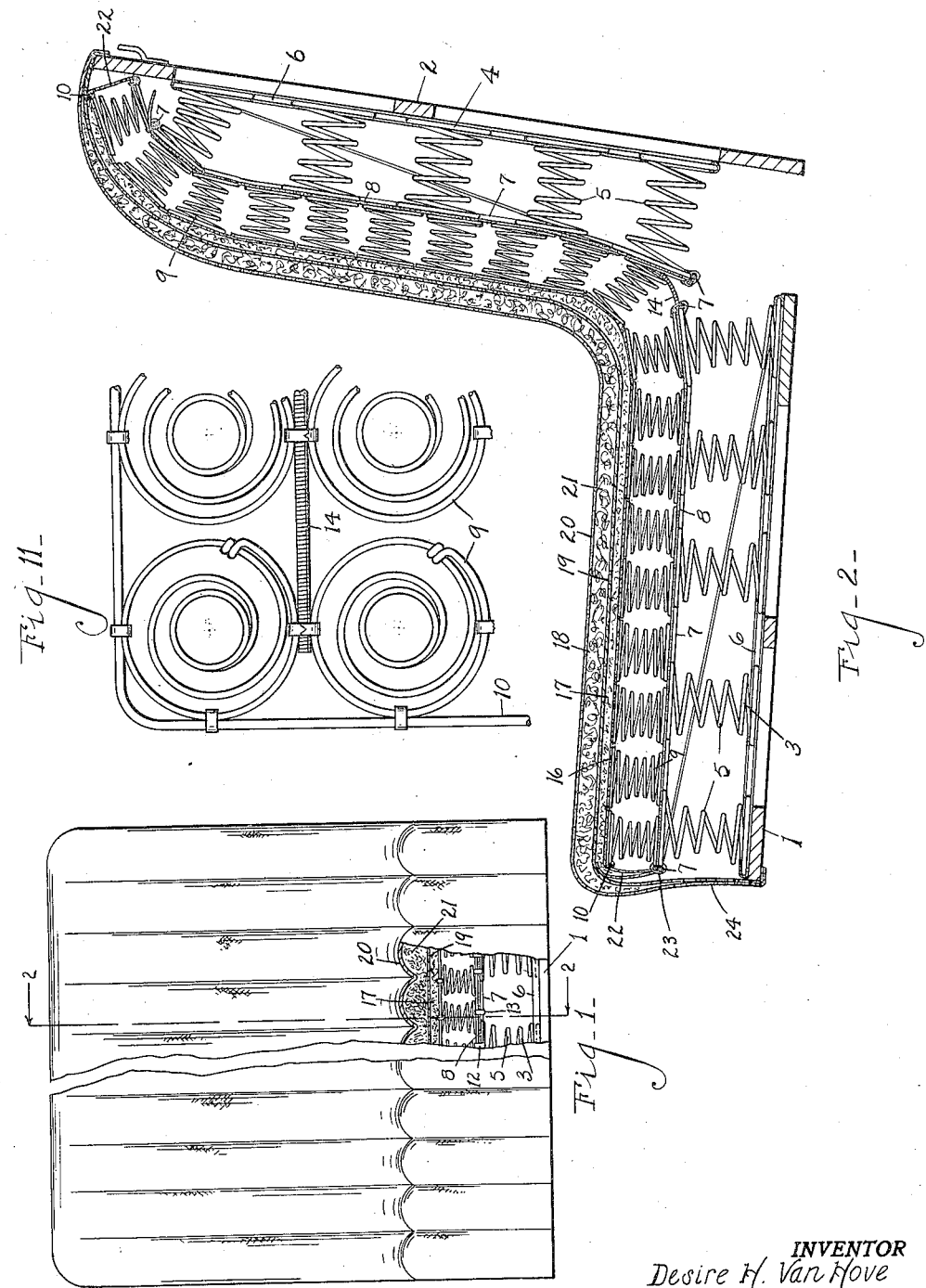
INVENTOR
Desire H. Van Hove
BY Chappell & Earl
ATTORNEYS

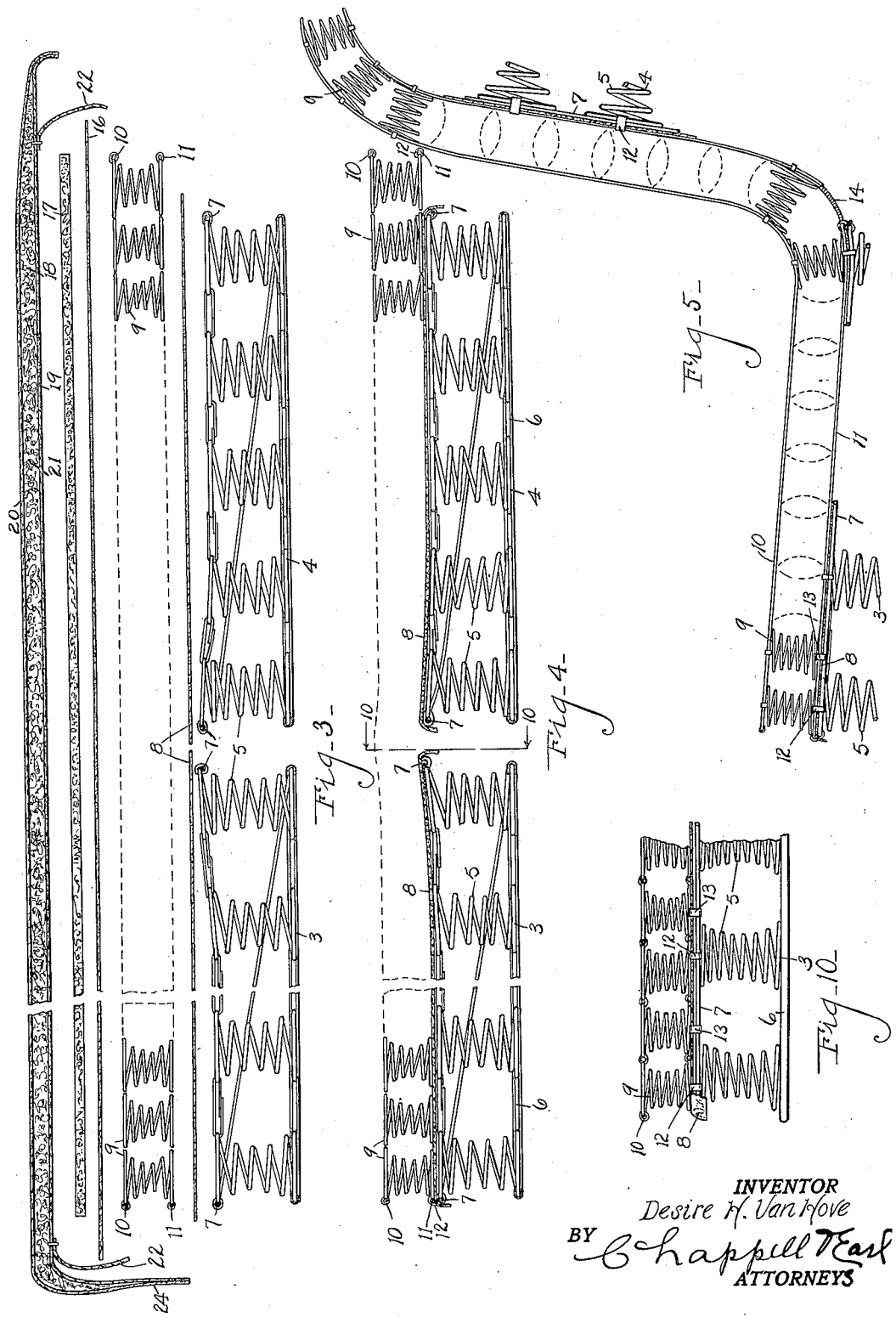

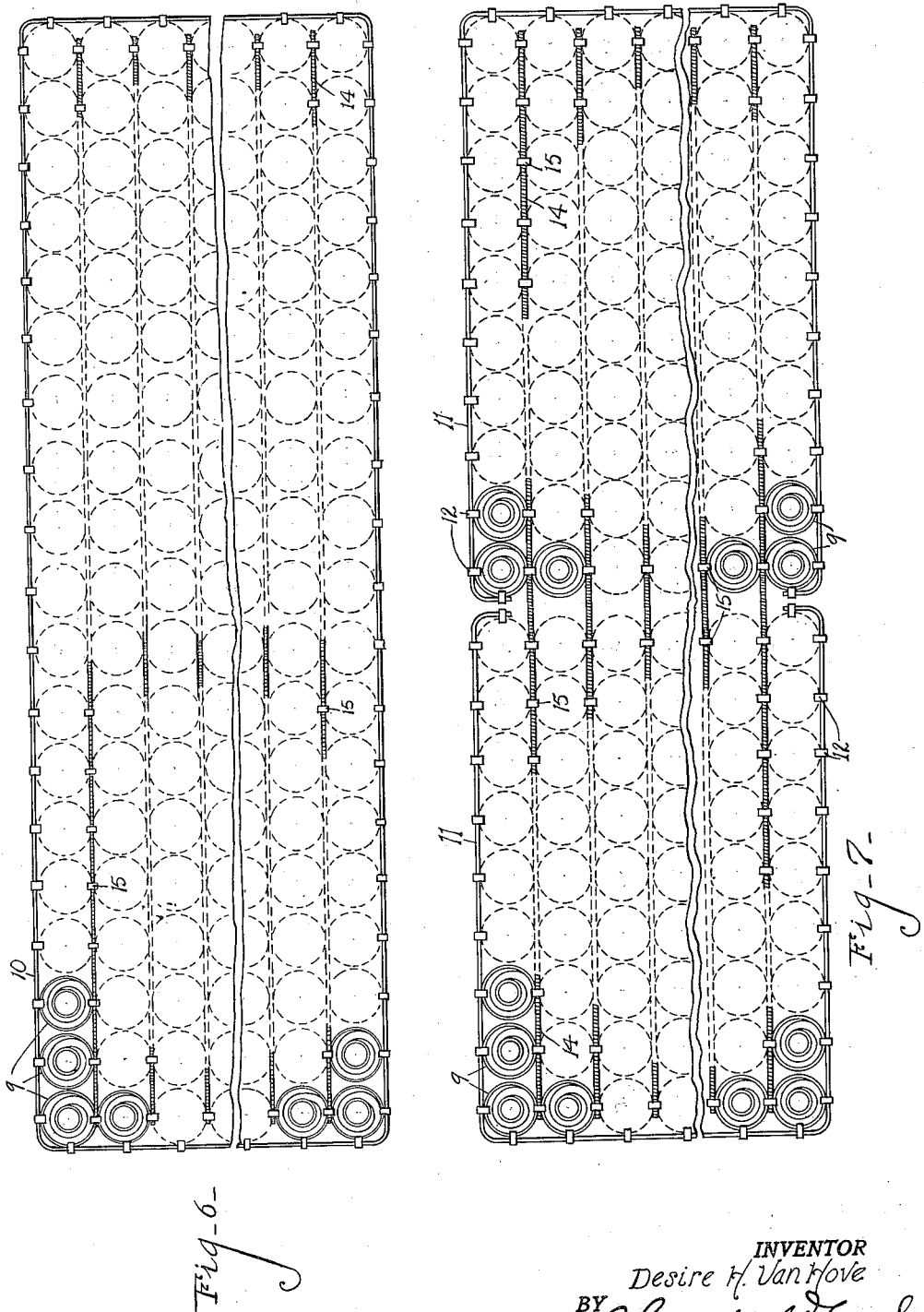

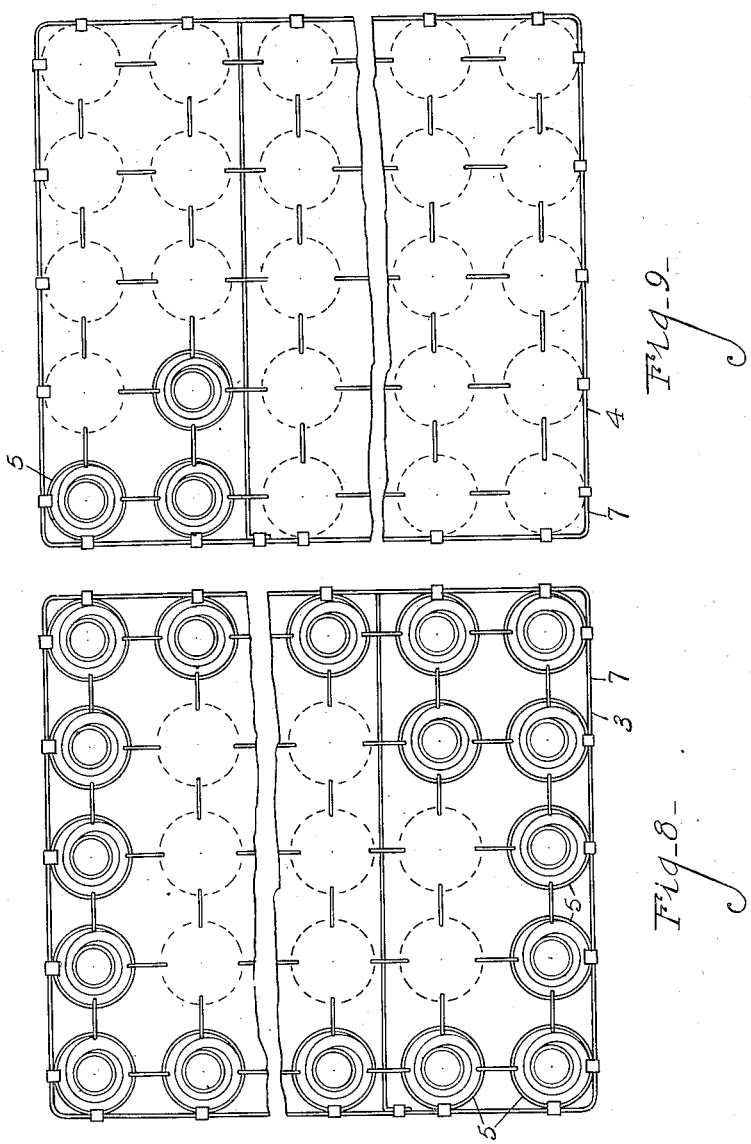

Patented May 12, 1931

1,804,722

UNITED STATES PATENT OFFICE

DESIRE H. VAN HOVE, OF ROYAL OAK, MICHIGAN, ASSIGNOR TO L. A. YOUNG SPRING AND WIRE CORPORATION, OF DETROIT, MICHIGAN

SPRING SEAT STRUCTURE

Application filed July 28, 1928. Serial No. 295,991.

The main objects of this invention are:

First, to provide a spring seat structure well adapted for automobiles and the like in which there is but very little frictional or rubbing movement between the body of the occupant of the seat on the back of the seat.

Second, to provide an improved spring seat for automobiles and the like which is very comfortable and for persons of different weight.

Third, to provide an improved spring seat of the character described which may be easily and economically installed in automobiles and is very attractive in appearance.

Objects relating to details and economies of my invention will appear from the description to follow. The invention is defined and pointed out in the claims.

A structure which is a preferred embodiment of my invention is illustrated in the accompanying drawings, in which:

Fig. 1 is a fragmentary front elevation of a seat embodying the features of my invention, the seat illustrated being shown as a complete unit.

Fig. 2 is a sectional view from front to rear, certain parts being shown conventionally.

Fig. 3 is a fragmentary sectional view of the several parts in disassembled relation.

Fig. 4 is a fragmentary sectional view through the seat and back units and the superstructure arranged thereon.

Fig. 5 is a fragmentary view, illustrating the flexible character of the superstructure and the position it occupies relative to other parts in use.

Fig. 6 is a fragmentary plan view of the superstructure.

Fig. 7 is a bottom view of the superstructure.

Figs. 8 and 9 are fragmentary plan views of the seat and back base units.

Fig. 10 is a detail section on line 10—10 of Fig. 4.

Fig. 11 is an enlarged fragmentary plan view of the superstructure.

In the drawings similar reference characters refer to similar parts throughout the several views.

Referring to the drawings, 1 represents a seat support and 2 a back support. These may be separate frames to be set into an automobile body as illustrated or the spring portion of the structure may be mounted directly in the vehicle body, the same being suitably formed to constitute or provide the supports 1 and 2.

I provide a seat base or bottom unit designated generally by the numeral 3 and a back base unit designated generally by the numeral 4. These units are formed of a plurality of body springs 5 of the helically coiled type assembled as a unit, the base frame being indicated at 6. These base frames are suitably secured to the supports, the securing means, however, not being illustrated.

Each of these base units is provided with top border frames 7. Fabric covers 8, either of textile or woven wire, are arranged on these base units to support the superstructure, the springs of which are in practice smaller and arranged more closely together than those of the base units.

I provide a combined back and seat superstructure consisting of body springs 9 preferably arranged in rows from front to rear, as shown in the accompanying drawings. The outer springs are secured to the top border frame 10 which is continuous.

The bottom border frame is in sections 11 which permits the superstructure being bent or conformed, as indicated in Fig. 5.

The superstructure is arranged on the seat and back units and its bottom border frames are secured to the top border frames of the seat and back units by means of clips 12, the springs constituting the rear portion of the seat when the structure is assembled being secured by clips 13 to the top border frame of the base unit, as shown in Fig. 10, the springs constituting the lower springs of the back portion of the superstructure being correspondingly secured to the top border frame of the back base unit.

Top and bottom coiled spring tie members 14 are disposed between the rows of springs of the superstructure and fixedly secured thereto by means of clips 15. These tie members being of coiled springs yield under load between the top and bottom so that the load on the superstructure springs is transferred directly to the supporting structure below.

The upholstery, in the embodiment illustrated, consists of a sheet of fabric 16 which is laid on the superstructure, a layer of padding 17 which is laid over this supporting fabric 16 and the upholstery proper 18 which constitutes the inner wall 19, the outer wall 20 and a filler 21. I have not attempted to illustrate the tufting or fluting of this upholstery.

The upholstery covering is provided with a flap 22 which is secured as by means of suitable clips 23. The skirt portion 24 of the upholstery is brought over and secured to the supports 1 and 2.

With the parts thus arranged, I secure an upholstery seat which is very comfortable and while it yields and shapes itself to the body of the particular user, it retains its shape and is very durable.

The back portion of the upholstery moves with the seat portion so that there is substantially no friction or movement between the back upholstery and the body of the occupant as is common with seats now generally used.

I have illustrated my improvements in a practical embodiment. I have not attempted to illustrate or describe various other adaptations and embodiments which I contemplate as I believe this disclosure will enable those skilled in the art to embody or adapt my improvements as may be desired.

Having thus described my invention, what I claim as new and desire to secure by Letters Patent, is:

1. The combination with seat and back supports, of seat and back units mounted on said supports and each comprising body springs and a top border frame and provided with superstructure supporting covers of fabric, a combined seat and back superstructure superimposed on said seat and back units and comprising body springs arranged in rows from front to rear, coiled spring top and bottom tie members arranged between said rows of springs and fixedly secured to springs of adjacent rows, a top border frame, a sectional bottom border frame, the sections being secured to the top border frames of said seat and back units, an upholstery covering provided with inner flaps secured to the top border frame of said seat and back units and a skirt portion secured to said supports.

2. The combination with seat and back supports, of seat and back units mounted on said supports and each comprising body springs and a top border frame, a combined seat and back superstructure superimposed on said seat and back units and comprising body springs arranged in rows from front to rear, coiled spring top and bottom tie members arranged between said rows of springs and fixedly secured to springs of adjacent rows, a top border frame, a sectional bottom border frame, the sections being secured to the top border frames of said seat and back units, and an upholstery covering provided with inner flaps secured to the top border frames of said seat and back units, and a skirt portion secured to said supports.

3. The combination with seat and back supports, of a seat unit and a back unit mounted on said supports in cooperating relation and each comprising body springs and a top border frame, a combined seat and back superstructure superimposed on said seat and back units and comprising body springs arranged in rows from front to rear, coiled spring top and bottom tie members arranged between said rows of springs and fixedly secured to springs of adjacent rows, an upholstery covering provided with inner flaps secured to the top border frames of said seat and back units, and an upholstery covering having a skirt portion secured to said supports.

4. The combination with seat and back supports, of seat and back units mounted on said supports and each comprising body springs and a top border frame, a combined seat and back superstructure superimposed on said seat and back units and comprising body springs, coiled spring tie members disposed from front to rear, a sectional bottom border frame, the sections being secured to the top border frame of said seat and back units, a combined seat and back upholstery covering unit arranged over said superstructure and provided with flaps secured to the top border frames of said seat and back units, and a skirt portion secured to said supports.

5. The combination with seat and back supports, of seat and back units mounted on supports and each comprising body springs and a top border frame, a combined seat and back superstructure superimposed on said seat and back units and comprising body springs, coiled spring tie members disposed from front to rear, a combined seat and back upholstery covering unit arranged over said superstructure and provided with flaps secured to the top border frames of said seat and back units, and a skirt portion secured to said supports.

In witness whereof I have hereunto set my hand.

DESIRE H. VAN HOVE.